May 29, 1951  T. J. MURPHY  2,554,538
ELECTRIC RECIPROCATING MOTOR
Filed Jan. 8, 1949  4 Sheets-Sheet 1

Inventor
Thomas J. Murphy
Wooster & Davis Attorneys

May 29, 1951  T. J. MURPHY  2,554,538
ELECTRIC RECIPROCATING MOTOR
Filed Jan. 8, 1949  4 Sheets-Sheet 2
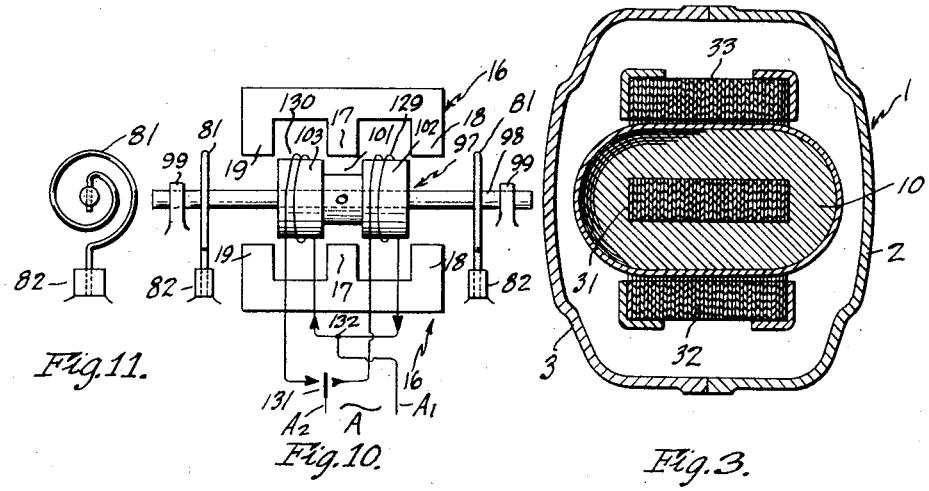
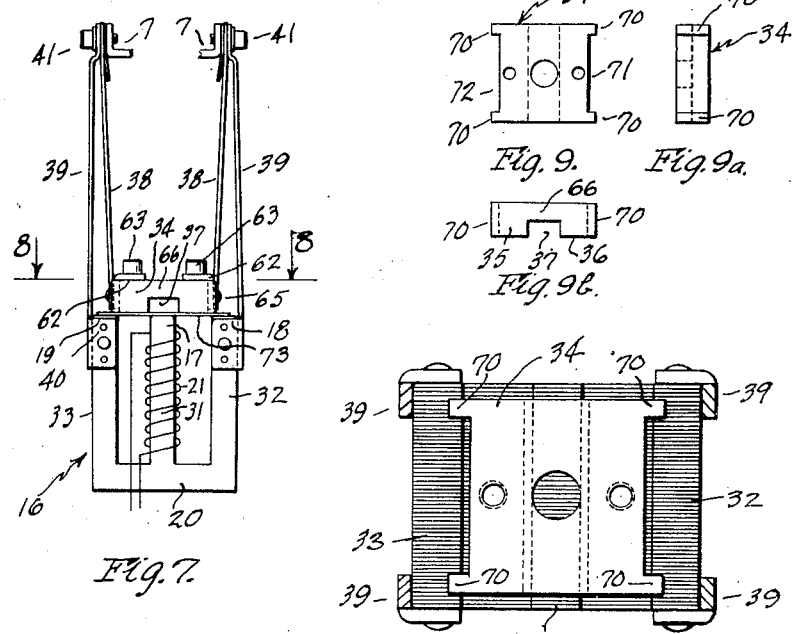
Inventor
Thomas J. Murphy
By Wooster & Davis Attorneys

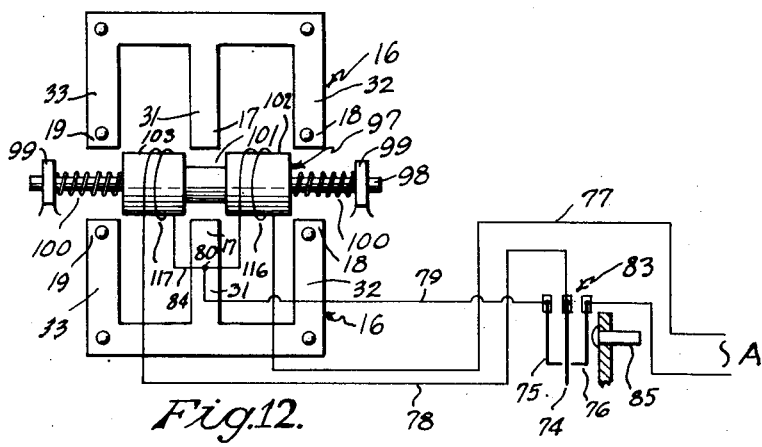
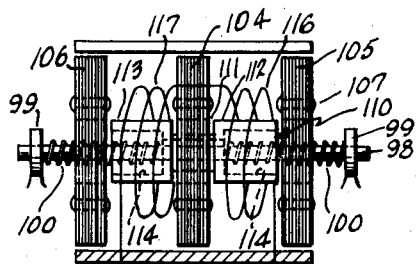
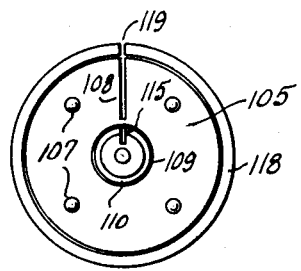
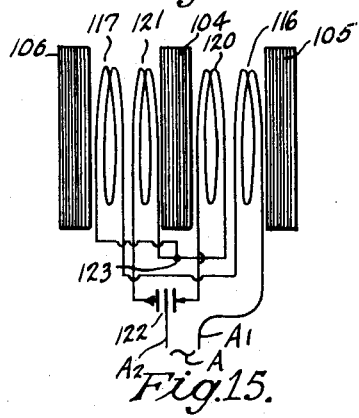
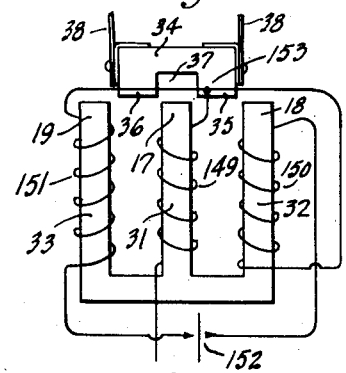

May 29, 1951  T. J. MURPHY  2,554,538
ELECTRIC RECIPROCATING MOTOR
Filed Jan. 8, 1949  4 Sheets-Sheet 4

Inventor
Thomas J. Murphy
Wooster & Davis  Attorneys

Patented May 29, 1951

2,554,538

UNITED STATES PATENT OFFICE 2,554,538

ELECTRIC RECIPROCATING MOTOR

Thomas J. Murphy, Stamford, Conn.

Application January 8, 1949, Serial No. 69,880
In Canada January 13, 1948

15 Claims. (Cl. 172—126)

This invention relates to an electric reciprocating motor or electric activator, and has for a particular object to provide an improved construction and arrangement whereby greater power and a longer stroke can be secured over the usual constructions without increasing the amount of metals or other materials employed.

Another object is to provide an improved construction and arrangement of electric motor or activator for such devices as dry shavers and similar devices using a reciprocating armature in which there is no make and break of the circuit to cause arcing or intereference with radios and similar devices.

It is a further object to provide an improved construction and arrangement for utilizing the reciprocating motion of the armature and transmitting it to the element to be operated.

With the foregoing and other objects in view I have devised the constructions illustrated in the accompanying drawings forming a part of this specification. It is, however, to be understood the invention is not limited to the specific details of construction and arrangement shown but may embody various changes and modifications within the scope of the invention.

In these drawings:

Fig. 3 is a transverse section substantially on the line 3—3 of Fig. 2;

Fig. 7 is a diagrammatical view showing the type of armature of Fig. 1 in an intermediate position with relation to the field pole pieces and also showing an improved means for properly locating the armature with relation to said pole pieces and securing the proper clearance between them;

Fig. 8 is a sectional plan view on an enlarged scale taken substantially on line 8—8 of Fig. 7, but omitting the mounting means for the armature;

Fig. 9 is a plan view of the armature of Figs. 7 and 8;

Fig. 9a is an end view thereof looking from the right of Fig. 9;

Fig. 9b is a side view looking toward the bottom of Fig. 9;

Fig. 10 is a diagrammatical view of a modified construction;

Fig. 11 is a detail view looking toward the left end of Fig. 10 and with the bearing support omitted;

Fig. 12 is a diagrammatical view showing another modification;

Fig. 13 is a somewhat diagrammatical view showing still another modification;

Fig. 14 is an end view looking from the right of Fig. 13;

Fig. 15 is a diagrammatical view showing a modified arrangement of the exciting means which may be used with the type of armatures and core pieces of Figs. 10, 12, 13, 15, 16 and 17, the armature being omitted to simplify the drawing;

Fig. 20 is a diagrammatical view showing still another modification of exciting means which may be used with this type of core and armature.

Figure 1:
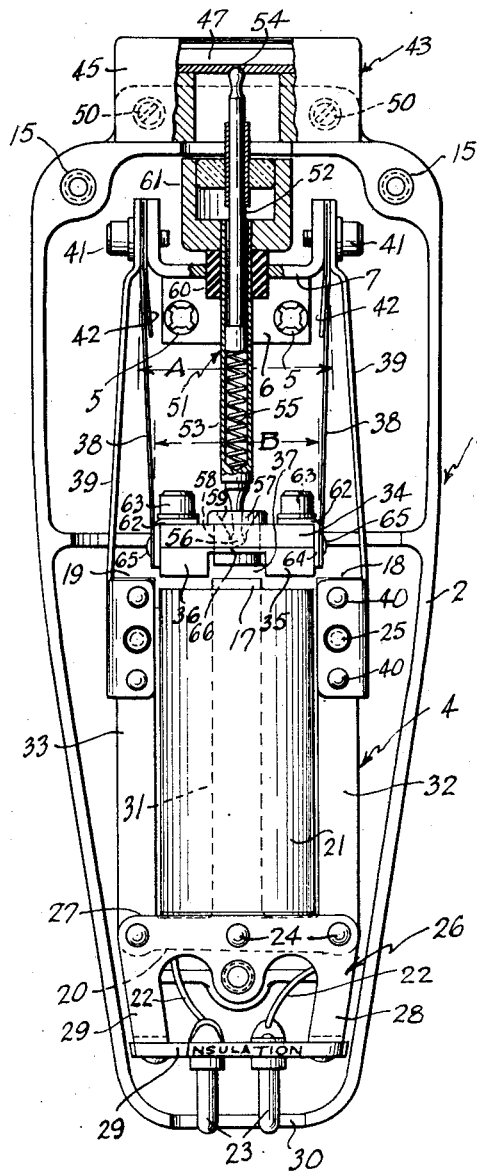
Fig. 1 is a side elevation of the device on an enlarged scale showing it applied to a dry shaver by way of example, one-half of the casing being removed to show the motor mechanism in elevation and certain parts being broken away to more clearly show the construction.

Referring first to Figs. 1 to 7, the motor or activator is shown as applied to operation of a dry shaving head, but this is shown merely by way of example, as it is to be understood the device is not limited to such use but is adapted for operating various devices. The motor is shown as mounted in a casing 1 of any suitable material, such, for example, as molded plastic, and this casing preferably comprises two separate halves 2 and 3 separable for access to the motor for inspection or repairs and to assist assembly. The motor is indicated as a whole at 4 and is mounted within the casing and may be secured therein by any suitable means, such, for example, as a pair of screws 5 passing through an arm 6 of a spacer bracket 7, the screws being threaded either into a suitable lug or boss 8 molded in one of the sections 2 of the casing or into metal inserts (not shown) molded into this boss. The lower end may be secured to the casing section 2 by a screw 9 in a molded boss 10 threaded into the cross member 11 extending between two brackets 26 secured to the lower end of the core by the rivets 24, and a similar screw 12 on the opposite side threaded into this cross head, which may be used for fastening the lower end of the other section 3 of the casing. The upper ends of the two sections of the casing may be connected by a pair of screws 13 through a boss 14 in one section threaded into molded inserts 15 molded into the other section.

The motor itself comprises a laminated core 16 comprising three spaced legs forming spaced poles 17, 18 and 19 connected at their lower ends at 20, the center leg 31 having pole 17 being embraced by the electric exciting coil 21 connected at its opposite ends through leads 22 to contact pins 23 adapted to be plugged into any suitable connector (not shown) provided with enclosed receptacle contacts, and connected by suitable leads with a plug-in cap or connector adapted for insertion in any standard outlet receptacle or plug connector in a house wiring system, for connecting the motor to a suitable source of alternating current.

Figure 2:
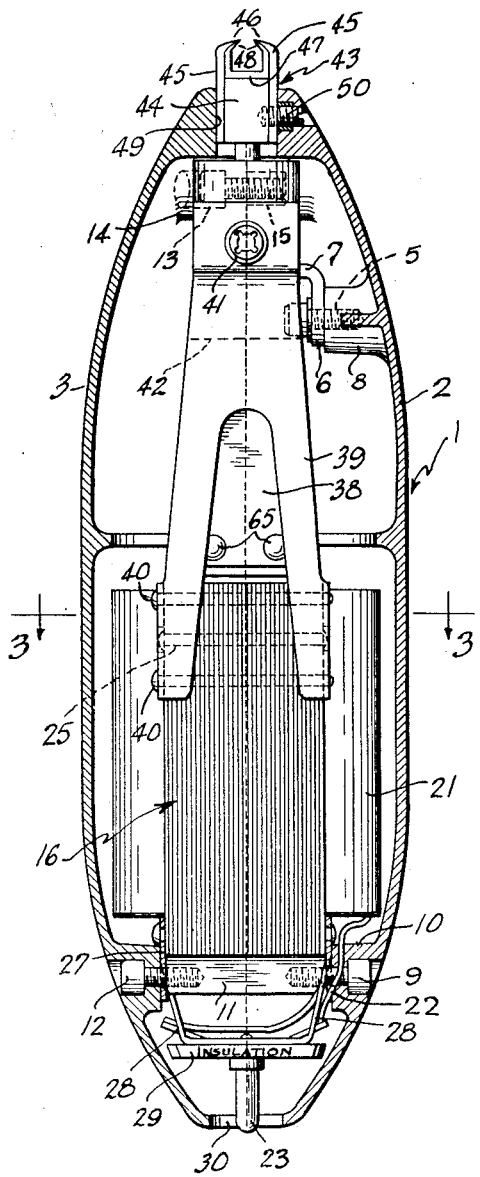
Fig. 2 is a view looking from the left of Fig. 1 showing the casing in section and the motor in elevation.

Although in Figs. 1 to 7 only one coil is shown for clearness and that about the center leg 31, it is to be distinctly understood the cores or legs may be excited by any of the arrangements of coils and circuits shown in Figs. 10 to 20. There are, therefore, two distinct magnetic circuits, one comprising the legs 31 and 32 with poles 17 and 18 and the armature, and the other the legs 31 and 33 with poles 17 and 19 and the armature. It is preferred that the core 16, as shown in Fig. 2, be made of a series of laminations of soft or proper magnetic steel and secured together by any suitable means, such, for example, as the rivets 24 and 25. The rivet 24 may also be employed for securing to the lower end portion of this core a pair of brackets 26 having side portions 27 secured to the core and provided with downwardly extending arms 28 secured to their lower ends to an insulating support 29 on which the contact pins 23 are mounted. The lower end of the casing is provided with an opening 30 in alignment with these contact pins for entrance of the plug receptacle to receive these pins.

Mounted to reciprocate across the free ends of the core legs 31, 32 and 33, or that is, across the poles 17, 18 and 19 of this core, is an improved armature 34 of suitable magnetic material, such, for example, as soft iron or steel, and this armature is of a substantially inverted U shape forming spaced poles 35 and 36. This armature as it reciprocates moves from one magnetic circuit to the other. It may be formed from a block of the proper metal and provided with a transverse recess 37 which thus separates the poles 35 and 36. This armature could be formed from a solid block, or, if preferred, it could be bent up to shape from a piece of metal of the proper thickness. The armature is mounted on resilient supporting means tending to move it to an intermediate position with respect to the core poles 17, 18 and 19, substantially as shown in Fig. 1. In the present arrangement it is supported on two spaced flat supporting springs 38 carried by two side frame members 39. These frame members are mounted at their lower ends on the outer legs 32 and 33 of the core by means of the rivets 40, which rivets may also extend through the laminations of the core and form an additional means for securing them together. Each frame member, as shown, is of substantially inverted V shape, as shown in Fig. 2, with the lower ends secured to core 16 and the upper ends connected by the spacer bracket 7, which is shown in Fig. 1 as substantially U shape, and the frame members 39 are secured to this bracket by the screws 41. The same screws are used to mount the springs 38, the upper ends of which may be located between frame members 39 and the upright side arms of the bracket 7. Short additional stiffening spring plates 42 may be provided between the springs 38 and the spacing bracket 7.

The upper ends of the side members 2 and 3 of the casing are spaced laterally to form a transverse channel 49 to receive the shaving head 43. This may be any suitable type of head, but in the form shown it comprises a central block 44 on the opposite sides of which are secured side plates 45 turned inwardly at their upper edges, as shown at 46, and provided with stationary guide or cutter teeth on these edges. Within this cutter head between the side plates 45 and on top of the block 44 is the inner or movable cutter member 47 preferably of substantially U shape in cross section and having inturned upper edges 48 provided with cutter teeth at the inside of the upper edges 46 to cooperate with them in cutting the hairs in the shaving operation. This head is seated in the channel 49 and secured therein by any suitable means, such, for example, as the screws 50, mounted in the section 2 of the casing and seated with their inner ends in the recesses in the cutter head.

The inner or movable member 47 of the cutter member is connected with the armature 34 for this operation by this armature through a drive rod 51. This drive rod comprises two telescoping sections 52 and 53, the upper section 52 having a rounded upper end 54 seated in a suitable recess in the lower side of the bottom wall of the movable cutter 47. The lower section 53 is a tubular section into which the lower end of the rod or section 52 is telescoped, and encloses a spring 55 tending to force the rod section 52 outwardly and retain its upper end 54 in the recess in the movable cutter member. The lower end of the section 53 is also a rounded head 56 in a mounting member 57 carried by the armature 34. This may be a block of suitable material, such as a block of molded plastic, seated in an opening 58 in the armature and provided with a recess 59 for the head 56, this recess being shaped to permit lateral rocking movement of the member 53 in this block due to lateral movements of the armature. The drive rod passes through a semi-hard rubber pad 60 mounted in the bracket 7 and forming a fulcrum for this rod which will yield slightly, this pad being a tight fit in an opening in the bracket to retain it therein. Carried by this rod and specifically on the upper section 52 above the fulcrum 60 is a counterbalancing weight 61 which is slidable on the rod, and after adustment to the proper location may be soldered in position to counterbalance the armature and reduce vibration due to the reciprocating movement of the armature. It is preferred to so locate the weight that the armature and its spring supports 38 are tuned to substantially the frequency of the alternating current supplied to the coil 21. The spring 55 not only holds the upper end of the drive rod in driving connection with the reciprocating cutter member 47, but it also acts to press the teeth on the upper edges 48 of this cutter against the under sides of the stationary teeth on the edges 46 of the outer or stationary cutter to always insure good shearing action between the teeth.

The supporting springs 38 may be directly connected to the armature 34 at their lower ends, but preferably a pair of angularly shaped yokes 62 are secured to the armature with their upper legs resting on top of the armature and secured thereto by the screws 63, while the upright legs 64 are located against the end of the armature and are secured to the springs 38 by the rivets 65. This makes the pull of the armature longitudinally of the screws 63 instead of transversely, as would be the case if the screws were passed through the springs into the ends of the armature. It is preferred that in the mounting for the armature the upper ends of the supporting springs 38 be spaced a somewhat greater distance, as shown at A in Fig. 1, than the spacing B of the lower ends which are secured to the armature, so that as the armature reciprocates, its outer ends will not be drawn away from the outer pole pieces 18 and 19 as much as they would be otherwise, and thus the armature is maintained in a closer relation to the core poles and the air gap between them is reduced, reducing the reluctance of the magnetic circuit, increasing efficiency and giving greater power. It will be evident from Fig. 1 that as the armature reciprocates right and left it will swing the lower end of the drive rod 51 back and forth about the fulcrum 60, which is yieldable slightly to prevent the armature from stalling when the latter is in dead center. Because of the yieldable fulcrum, for small displacement of the armature the true fulcrum is shifted to the top of the drive pin and consequently no work or load is put on the armature for small displacements. This will reciprocate the drive pin 51, which in turn through connection of its upper end to the movable cutter 57 will reciprocate this cutter for the shaving operation.

The armature is reciprocated across the core poles as the flux area is reversed by the coil 21 because of the alternating current passing through this coil. The armature, therefore, passes from one magnetic circuit to the other. An important part of the present construction is the transverse cut away portion or recess 37 in the armature, which separates the two poles 35 and 36 by an air gap, although they are magnetically connected above this gap, as shown at 66. It has been found in actual tests in operation that this construction and arrangement gives greatly increased power over what would be secured with a straight armature without this recess. It is believed that it is caused by the multiple variable air gaps and polarization of the armature. The depth of the recess may vary, but to secure this effect it should be sufficient to form an air gap to increase the reluctance between the poles of the armature, so that the greater proportion of the flux instead of passing across this air gap will pass through the connecting body portion 66 and form a distinct magnetic pole at the opposite sides of the air gap. In other words, the depth of the recess need be only sufficient to make a substantial difference in reluctance over that of the gap between the pole tips and the adjacent faces of the armature.

It is also believed that with this arrangement, on reversal of the flux in the center leg 17 of the core, there is very little reversal of flux in the outer legs 18 and 19. For example, when the armature 34 is shifted to its extreme right hand position, its pole 35 is over the pole 18, while the armature pole 36 is over the central pole 17. Now, if it is assumed the central pole 17 is north, pole 36 will be south, pole 35 will be north, and pole 18 south. This is the position with the maximum current in the coil 21. As the current reduces to zero the springs 38 swing the armature backwardly or to the left, and will carry the air gap 37 beyond the central pole 17 as the current reverses in the coil, and on the other half of the cycle the central pole 17 will be south, but at this time the pole 35 has approached the pole 17 so that this pole 35 will still remain north and the pole 36 has approached the other side pole 19, and as the pole 19 is now north, pole 36 remains south. There is, therefore, very little if any reversal of flux in the armature and there is no necessity for laminating this armature, and the losses in the armature are reduced to a minimum. It will also be seen that as the armature is approaching the poles 17 and 19 at the time the current is reversed within the coil 21, and the polarity of central pole 17 is reversed, the air gap between the pole 35 of the armature and the pole 18 of the core is increased to a maximum, increasing the reluctance of the magnetic circuit from the central pole 17 to the armature and pole 18. It is, therefore, believed that the flux density in this circuit will be very low, so that there would be practically no reversal of flux in the outer leg 32 carrying the pole 18. The same would be true of the outer leg 33 carrying the pole 19 on the other half of the cycle, and therefore, it is believed that practically all the reversal of flux is in the center leg 31 carrying the pole 17. For this reason it is not necessary to laminate the outer legs 32 and 33 and poles 18 and 19.

As suggested in connection with Fig. 1, it is preferred that the distance between the upper ends of the supporting springs 38, as shown at A in Fig. 1, be somewhat greater than the distance between their lower ends as indicated at B, so that in the intermediate position of the armature these springs are inclined upwardly and outwardly somewhat. The difference need not be great, depending on the stroke of the armature. In such devices as ordinary dry shavers it may be about 1/16" greater. It will be seen that with this arrangement as the armature moves laterally the free or outer end would not be drawn upwardly away from the core pole so quickly as would be the case were the distances the same, thus maintaining the armature in closer relation to the core poles and reducing the air gap when the armature is in an extreme lateral position, which tends to give a greater flux density because of reduced reluctance, and increases the efficiency and power. It has been possible with this arrangement to effectively operate the device with the spacing between the poles of the core and armature of only .003".

Figs. 7 to 9b show an improved means and arrangement whereby the proper spacing between the poles of the armature and the poles of the core may be easily and accurately determined. For this purpose, at each corner of the armature 34 it is provided with a projecting rib or lug 70 projecting from the opposite ends 71 and 72 of the armature, and although the distance between the ends 71 and 72 is somewhat less than the distance between the inner edges of the outer poles 18 and 19 of the core 16, these extensions, ribs or lugs 70 are extended far enough to overlap the ends of the poles 18 and 19 as shown more clearly in Fig. 8.

In mounting or positioning the armature and adjusting it to the desired air gap between it and the poles 17, 18 and 19, preferably about .004" or .003" as this has proved very satisfactory, it is first mounted loosely in the supports 38 and 39 and a spacer or gauge plate 73 of a thickness equal to the desired clearance (in this case .004" or .003") is placed between the armature and the ends of the poles 17, 18 and 19 and with the extensions or lugs 70 overhanging the poles 18 and 19. Then a direct current is applied to the coil 21 which by magnetizing the poles draws the armature tightly down against the spacer 73. Then the securing means for the armature such as the screws 63 and 41 are set up or tightened, thus accurately mounting the armature at the proper spacing or clearance from the core poles. After cutting off the current to coil 21 the spacer 73 may be readily removed. This provides a very effective and quick method of accurately positioning the armature and providing the proper air gap or clearance, which was a difficult and tedious operation by the old methods.

Different constructions and arrangements of the armature and also of the core may be employed. Thus while in the form of Figs. 1 to 7, the core comprises three legs 31, 32 and 33, connected at their lower ends with three spaced poles 17, 18 and 19, at their upper ends, and excited by various arrangements of coils as shown in Figs. 17, 18, 19 and 20. Modified forms of armature with modified cores and pole pieces are shown in Figs. 10, 12, 13, 15, 16 and 17, although they all work on the same principle.

In Figs. 10 and 11 is shown a modified arrangement which may be used. In this arrangement three-legged laminated cores 16 corresponding to the cores 16 of Figs. 1 to 7 are arranged around a cylindrical armature. In the present case there are shown two of these cores on opposite sides of the armature, but any number desired within the space available may be used placed around the armature on all sides. The armature is carried by a supporting rod 98 mounted to slide in suitable bearing supports 99 with springs 81 connected by any suitable means at their free ends to the rod 98 and mounted in stationary supports 82. The wire of the spring may be round, flat or any suitable cross section. These springs tend to shift the armature to an intermediate position with respect to the core poles 17, 18 and 19. These are spiral or convolute springs and because of this shape do not need to be prestressed, but when in the intermediate or neutral position are unstressed and are stressed only when they are moved from this position in either direction. These springs are therefore not stressed when the armature is in the central or intermediate position, and it is therefore free to move in either direction. With the cylindrical coiled springs of the type shown at 133, 134 of Fig. 17 they are prestressed so as to expand when the other spring is compressed by movement of the armature from the central position so the spring is always in contact with the collar 137. Otherwise the collar would move away from the springs alternately resulting in noisy operation. The wiring arrangement of Fig. 10 for exciting the cores is the same as that in Figs. 17 and 18 and is described in detail in connection therewith. The armature is provided with an annular groove 101 corresponding to the recess 37 of the form of Figs. 1 to 7 forming two spaced poles 102 and 103 corresponding to poles 35 and 36 of the first form.

In Fig. 12 is shown a modified arrangement which may be used with this construction. In this arrangement three-legged laminated cores 16 corresponding to the core 16 of Figs. 1 to 7 are arranged around a cylindrical armature 97, in the present case there being shown two, one on each side of the armature, but any number within the space available may be located around the armature. The armature is carried by a supporting rod 98 mounted to slide in suitable bearing supports 99 with springs 100 embracing these rods between the bearings and the armature and tending to move it to an intermediate position with respect to the core poles 17, 18 and 19. These springs are prestressed, that is, are compressed somewhat when the armature is in the intermediate position so that as it moves in either direction from this position the spring from which the armature is moving will expand so as to follow along with the armature and maintain contact with it. Otherwise the armature would move away from the spring and the device would be more noisy.

Figure 17:
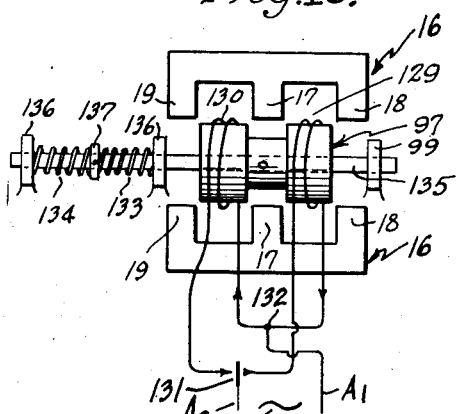
Fig. 17 is a diagrammatical view showing another modification.

Although in the form shown in Fig. 12 the springs are arranged one at each of the opposite ends of the armature, they both may be arranged at one end, as shown in Fig. 17, making them somewhat more accessible for inspection or repairs, but the operation and result are the same in both arrangements. The armature is provided with an annular groove 101 corresponding to the recess 37 of the form of Figs. 1 to 7, forming two spaced poles 102 and 103 corresponding to the poles 35 and 36 of the first form. This operates on the same principle as the arrangement of Figs. 1 to 7, but as the armature is cylindrical a plurality of the three-legged exciting cores can be placed about the armature and thus add their effect to increase the power of the armature.

The A. C. exciting coils 116 and 117 for the magnetic circuits are located between the core legs 31, 32 and 33 and surround the armature, their inner ends being connected together as shown at 80 and their outer ends being connected by leads 77 and 78 to an A. C. supply A so that the coils are in series. There may be connected in one of these connections a starting switch indicated as a whole at 83. This switch is shown diagrammatically as comprising three spring contacts 74, 75 and 76 placed with the central contact 74 between the contacts 75 and 76 and their spring action tending to keep them separated as shown. Any suitable manually operable means is shown for closing the contacts, such for example as the push button 85. The contact 76 is connected to one side of the A. C. supply A, the contact 74 to the outer end of the coil 117 as shown by lead 78, contact 75 is connected between the two coils 117 and 116 as shown at 80 by lead 79 and the outer end of the other coil 116 is connected to the other side of the A. C. supply as shown by lead 77. In operation, if button 85 is pushed inwardly or to the left as viewed in Fig. 12, it will shift contact 76 into engagement with contact 74 closing the circuit through coils 116 and 117 and then further movement will bring central contact 74 into engagement with contact 75. This will short circuit the coil 117 so that coil 116 only will be energized to shift the armature. This will insure starting of the device and prevent stalling, which might happen if the armature were accurately centered and the two coils operating simultaneously. After the device starts the push button is partly released so as to permit the center contact 74 to move away from the contact 75, but contacts 74 and 76 remain in engagement maintaining the circuit closed through the two coils 116 and 117 in series, which is the position of the switch during working operation of the device. The center pole 31 with the outer poles 32 and 33 form two magnetic circuits, one represented by the poles 31 and 32 and the other by poles 31 and 33, with the connecting portions of the cores. The armature moves alternately from one magnetic circuit to the other across the magnetic pole 31 at the center as in the previous forms. The A. C. exciting coils 116 and 117 for the magnetic circuits are located between the poles 31 and 32 and 31 and 33, and surround the armature, and they are connected in the A. C. supply circuit as indicated. The armature is reciprocated by excitation of the cores and their poles, the coils being wound in a direction so that the center pole 31 is always complementary to the outer poles 32 and 33, the polarities of these cores and poles reversing as the current in the coils reverses during each cycle of the A. C. supply. The springs 100 are tuned generally to the frequency of the A. C. supply, although this tuning is not critical.

In Figs. 13 and 14 is shown somewhat diagrammatically a modified arrangement of the field cores and coils for operating the same type of armature as shown in Fig. 12. In this arrangement the field cores 104, 105, and 106 each comprise laminated discs. That is, they each comprise a plurality of laminations comprising relatively thin iron discs placed side by side and connected together by any suitable means, such, for example, as rivets 107, and are also preferably provided with a radial slot 108 forming an air gap to reduce eddy currents in the cores. They have central openings 109 through which the cylindrical armature 110 may reciprocate, this armature being similar to that shown at 97, Fig. 12, and mounted in a similar manner on a shaft 98 sliding in suitable bearings 99 with coil springs 100 on this shaft tending to move the armature to a central or intermediate position. As in the other form, the armature is reduced at 111 forming an air gap between spaced poles 112 and 113 corresponding to the poles 102 and 103. To reduce the weight of the armature and therefore reduce its momentum and vibration, these enlarged end or pole portions 112 and 113 may be hollowed out, as shown at 114, from their outer ends. This reduction of weight of the armature also permits the use of armatures of a larger diameter to reduce air gap reluctance. This armature may also be provided with a radial slot 115 extending longitudinally to reduce eddy currents in the armature. The center core 104 with the outer cores 105 and 106 form two magnetic circuits, one represented by the cores 104 and 105 and the other by cores 104 and 106. The armature moves alternately from one magnetic circuit to the other across the magnetic pole at the center as in the previous forms. The A. C. exciting coils 116 and 117 for the magnetic circuits are located between the cores 104 and 105 and 104 and 106 and surround the armature, their inner ends being connected together and their outer ends being connected to an A. C. supply A, so the coils are in series. This arrangement operates the same as the device of Fig. 12, the armature being reciprocated by the excitation of the cores, the coils being wound in a direction so that the center core or pole 104 is always complementary to the outer cores or poles 105 and 106, the polarities of these cores of course reversing as the current in the coils reverses during each cycle of the A. C. supply. The springs 100 are tuned generally to the frequency of the A. C. supply, although this tuning is not critical. The cores and coils may be enclosed in a cylindrical housing or casing 118 and this may be provided with a longitudinal slot 119 to provide an air gap to reduce eddy currents. This arrangement operates the same as that of Fig. 12, the two coils being in effect the same as a single coil. The same operating and starting switch 83 shown in Fig. 12 may be used with this arrangement.

An alternate arrangement for exciting the type of core and armature arrangement of Figs. 12, 13 and 14 is shown in Fig. 15. Only the core discs and coils are shown, the outer casing or housing and the armature being omitted to simplify the drawing. The cores 104, 105 and 106 are the same as in Figs. 13 and 14, forming two magnetic circuits, and the two A. C. coils 116 and 117 are connected in series, the same as in Figs. 12 and 13, and located between the center cores 104 and 105 and 104 and 106. They are connected to the alternating current supply A and are so wound that the center core 104 is always complementary to the outer cores 105 and 106. However, in this arrangement there also is provided two D. C. coils 120 and 121 associated with the A. C. coils 116 and 117 respectively, and they are connected to one side of the A. C. supply through a rectifier 122. These coils are connected in series but they are connected at the mid-point 123 with the A. C. coils, and the rectifier is so arranged that these D. C. coils are alternately excited on reversal of current in the A. C. coils, and are additive to the respective adjacent A. C. coils, the A. C. coils being so wound as to excite the center core or pole 104 in one sense during one half of the A. C. cycle and in the opposite sense during the other half of this A. C. cycle, and the outer poles 105 and 106 being always complementary to the center pole. The effect on the armature is fundamentally the same as that described in connection with Figs. 7, 12, and 13, but the effect of the D. C. coils is alternately added to that of the A. C. coils in each magnetic circuit, or that is, each pair of poles 104 and 105 and then 104 and 106, thus increasing the power of the poles on the armature. Thus, if it is assumed that during one half of the A. C. cycle the current is entering on the right hand side A$^1$, the two A. C. coils 116 and 117 are excited as they are in series, and the current will also pass through the D. C. coil 120 through the rectifier 122 and out the other side A$^2$ of the circuit, but there will be no current through the D. C. coil 121 because it would be stopped by the rectifier. On reversal of the current on the other half of the cycle, the two A. C. coils will be energized in the opposite sense and the current will flow through the rectifier and the D. C. coil 121, but the rectifier will prevent flow of current in the D. C. coil 120.

Figure 16:
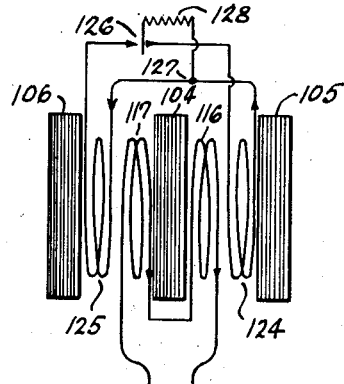
Fig. 16 is a diagrammatical view showing a modified arrangement for use with a longitudinally reciprocated type of armature similar to that of Figs. 10, 12, 13 and 17.

In Fig. 16 is shown another arrangement of the exciting coils. In this case there are two A. C. coils 116 and 117 connected in series corresponding to the A. C. coils in Fig. 13, which excite the center pole 104 and the complementary outer poles 105 and 106 in different senses during reversal of the current in each cycle. However, associated with each A. C. coil 116 and 117 is a D. C. coil 124 and 125 respectively. The coils are each connected at one end to the opposite sides of the rectifier 126 and at an intermediate point 127 through a resistance 128 to the center of this rectifier. In this arrangement the D. C. coils are inductively coupled to the A. C. coils and not directly connected to them. In this case the D. C. current flows through the D. C. coils alternately, first one and then the other, on reversal of the A. C. current in the A. C. coils during each cycle, as indicated by the arrows, but in this case, due to the inductive coupling, they reduce the effect of the A. C. coils or subtract from it, instead of being additive as in the form of Fig. 15. In each case, however, they modify or supplement the action of the A. C. coils, preventing any stopping of the armature on dead center and always incurring self-starting of the device even under heavy loads. In this figure the armature is also omitted to reduce complication of the drawing, but it will be understood this arrangement is intended for use with the type of armature shown in Figs. 12, 13 and 17.

In Fig. 17 is shown another arrangement using this same type of armature, but employing the type of field cores or poles used in Figs. 10 and 11. Here there are two D. C. coils 129 and 130 connected with the A. C. supply A through a rectifier 131. With this arrangement the opposite ends of the rectifier are connected to one end of each coil, the other ends of the coils being connected at the intermediate point 132 to one side $A^1$ of the A. C. supply, the opposite side $A^2$ being connected at the intermediate point of the rectifier. The inlets to the two coils are thus connected to one side of the A. C. supply and the outlets to the other side, and they are wound so that they alternately excite the two magnetic circuits provided by the pairs of poles 17 and 18 and 17 and 19, and excite the circuits alternately in the opposite sense, so that the armature 97 is reciprocated. This same wiring and exciting arrangement is shown in Fig. 10. In this Figure 17 there is shown a slight modification in the arrangement of the springs tending to shift the armature to the intermediate position. In this arrangement, intead of being located on the opposite ends of the armature, shown in Figs. 11 and 13, these two springs 133 and 134 on the armature shaft 135 are both located outside the pole cores on the same end of the armature. They are located between the bearings 136 for the shaft with a collar or flange 137 between them secured to the shaft so that when compressed they tend to shift the armature in the opposite direction and thus tend to shift it to an intermediate position. Although this arrangement of coils and armature is shown with the type of field cores illustrated in Figs. 7, 10 and 12, they may be employed with the type of field cores shown in Figs. 13 to 16.

Figure 18:
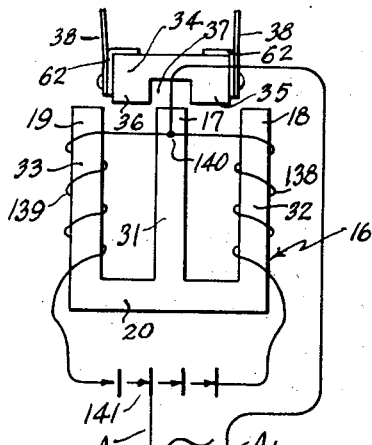
Fig. 18 is a diagrammatical view showing a modified arrangement of exciting means which may be used with the type of core and armature of Figs. 1 to 9.

In Fig. 18 is shown a modified arrangement of coils for exciting the types of core or field poles and armature illustrated in connection with Figs. 1 to 7. In this case there are two D. C. coils 138 and 139 around the outer legs or poles 18 and 19 connected with their corresponding ends through an intermediate point 140 with one side $A^1$ of the A. C. current supply. The other ends of these coils are connected through the rectifier 141 to the other side $A^2$ of the A. C. supply, the coils being connected to the outer sides of the rectifier and the A. C. supply being connected to the intermediate or center of the rectifier. In this arrangement the coils are alternately excited by a D. C. current on reversal of the A. C. current for each cycle to excite the two magnetic circuits alternately with pairs of poles 17 and 18 and 17 and 19 to reciprocate the armature 34. This arrangement is really the same as that shown in Figs. 10 and 17, but illustrating how this arrangement can be used with the type of core and armature of Figs. 1 to 7.

Figure 19:
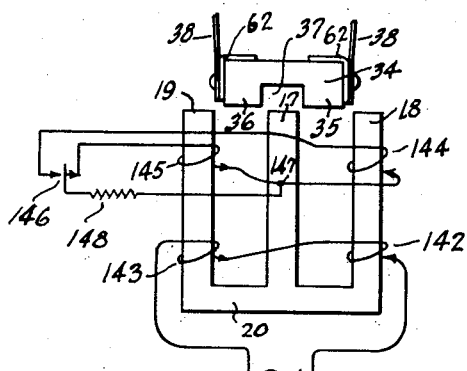
Fig. 19 shows a diagrammatical view of another modification of the exciting means for this type of core and armature.
Figure 6:
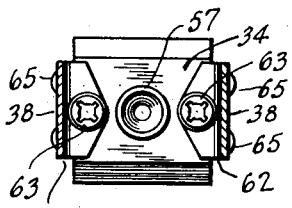
Fig. 6 is a top plan view showing the supporting springs in section and the driving rod omitted.
Figure 5:
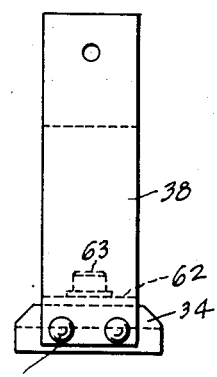
Fig. 5 is a side elevation looking from the left of Fig. 4.
Figure 4:
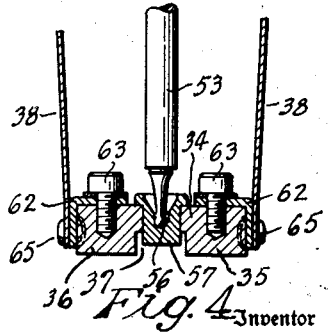
Fig. 4 is a longitudinal section of the armature and its mounting of Figs. 1 and 2.

Fig. 19 illustrates a further modified arrangement of the exciting coils for this same type of cores and armature as shown in Figs. 1 to 7 and 18. The coils here are really the same as those shown in Fig. 16, comprising two A. C. coils 142 and 143, embracing the outer pole pieces 18 and 19 and corresponding to the coils 116 and 117 respectively of Fig. 16 and wound in the same sense and connected in the same manner to the A. C. supply A. Also embracing these two outer pole legs 18 and 19 are D. C. coils 144 and 145 corresponding to the coils 124 and 125 of Fig. 16 and connected in the same manner to a rectifier 146, the two coils being connected at an intermediate point 147 to a resistance 148 to the center or intermediate point of the rectifier and connected at their opposite ends to the opposite sides of the rectifier. The operation here is the same as that described in connection with Fig. 16. The D. C. coils in this case, instead of being connected in the A. C. circuit, are inductively coupled to this circuit and operate to modify the action of the A. C. coils in exciting the two magnetic circuits and the reciprocating armature, in the same manner as described in connection with Fig. 16.

Fig. 20 shows still another modified arrangement for exciting the field and armature comprising the two magnetic circuits, and as shown in connection with the type of field cores and armature illustrated in Figs. 1 to 7. In this case there is a single A. C. coil 149 embracing the center pole of the leg 17 and two D. C. coils 150 and 151 embracing the two outer legs 18 and 19. One side of the A. C. supply is connected to the intermediate point or center of the rectifier 152, the outer sides of the rectifier being connected to one end of the respective D. C. coils 150 and 151, the other similar ends of these coils being connected at an intermediate point 153 with the other end of the A. C. coil 149. The current in the A. C. coil 149 is of course alternately reversed during each cycle of the A. C. supply, and through the action of the rectifier 152 the two D. C. coils 150 and 151 are alternately energized to alternately modify and supplement the action of the A. C. coils on the two magnetic circuits of the pair of poles 17 and 18 and 17 and 19. In this case, however, as the D. C. coils are connected to the A. C. circuit their effect is additive to that of the A. C. coils, thus increasing the power or pull on the reciprocating armature, but acting as in the other arrangements described in preventing any dead center position of the armature and also insuring self-starting under all conditions, even under load. The D. C. coils 150 and 151 are so wound that they are alternately in series with the center A. C. coil 149, so that their effect is additive to that of this A. C. coil.

In all the arrangements shown using the combination of A. C. and D. C. coils, the A. C. coil or coils are the main source of excitation of the field cores or poles, and they excite the two separate magnetic circuits alternately, as described. The D. C. coils are alternately in series with the A. C. coil or coils and effect opposite sides or opposite magnetic circuits so that their effect is additive to that of the A. C. coil or coils on these circuits, except in the arrangements of Figs. 16 and 19, where the D. C. coils are not directly connected to the A. C. circuit but are only inductively coupled to this circuit. The A. C. coils are always wound so as to excite the center pole or to produce an excited pole in the center the sense of which is reversed as the current reverses and the outer poles are always complementary to the center pole, so that the armature is alternately affected in a different sense to reciprocate it. In other words, the main exciting source is the A. C. coils, and the D. C. coils are modulating windings usually of a considerably less number of coils, generally about one-fourth, of those of the A. C. coils, although of course the proportion may vary. Because of this, the number of discs in the rectifiers can be materially reduced. This combination prevents any dead center, so that the device is always self-starting, even under load. They also reduce the power required for the same conditions, or in other words increase the efficiency.

Although not limited to such use, the arrangements using the combination of A. C. and D. C. coils with the D. C. coils modulating the A. C. coils, have distinct advantages when used in operating electric dry shavers such as that shown in Figs. 1 and 2, for example, and similar devices, where quietness and non-sensitiveness to frequency changes are factors. These arrangements can be made more quiet than where the excitation is by A. C. only, because wider air gaps may be used between the poles. This construction also permits the use of fewer laminations in the core members.

It is to be understood that the showing of the various coils in Figs. 7 to 20 are diagrammatic and are therefore intended primarily to merely indicate coils or windings, and they should in each case be wound in the sense indicated in the description and claims.

Having thus set forth the nature of my invention, I claim:

1. An activator of the character described comprising two magnetic circuits each including spaced magnetic poles of different polarity, alternating current means for magnetizing the poles comprising a coil for each magnetic circuit, a rectifier including an intermediate connection between rectifying units and connections from the opposite sides of these units, means connecting the coils in series with each other and the rectifier, means connecting the intermediate rectifier connection with one side of an A. C. supply, means connecting the other side of the A. C. supply to the connection between the coils, and an inductively polarized armature closely adjacent the pole tips whereby it is inductively polarized by the electrically magnetized poles, said armature being movable transversely of the pole tips alternately from one magnetic circuit to the other and comprising a pair of spaced poles with a gap between them and magnetically connected on the opposite side of the gap from the first poles, and resilient means tending to move the armature to position its poles in an intermediate position with respect to the poles of the respective magnetic circuits once per alternation of the impressed frequency.

2. An activator of the character described comprising two magnetic circuits each including spaced magnetic poles of different polarity, alternating current means for magnetizing the poles comprising a coil for each magnetic circuit, a rectifier including an intermediate connection between rectifying units and connections from the opposite sides of these units, means connecting the coils in series with each other and the rectifier, means connecting the intermediate rectifier connection with one side of an A. C. supply, means connecting the other side of the A. C. supply to the connection between the coils, and an inductively polarized armature closely adjacent the pole tips whereby it is inductively polarized by the electrically magnetized poles, said armature being movable transversely of the pole tips alternately from one magnetic circuit to the other and comprising a pair of spaced poles, and resilient means tending to move the armature to position its poles in an intermediate position with respect to the poles of the respective magnetic circuits once per alternation of the impressed frequency.

3. An activator of the character described comprising a core including three connected spaced legs forming two magnetic circuits each including spaced poles, windings adapted for connection to an alternating current supply for magnetizing the legs comprising a coil for each magnetic circuit, a rectifier including an intermediate connection between rectifying units and connections from the opposite sides of these units, means connecting the coils in series with each other and the rectifier, means connecting the intermediate rectifier connection with one side of an A. C. supply, means connecting the other side of the A. C. supply to the connection between the coils, and an inductively polarized armature closely adjacent the poles whereby it is inductively polarized by the electrically magnetized poles, said armature being movable transversely of the latter poles alternately from one magnetic circuit to the other, said armature comprising a pair of connected poles at its ends, and resilient means tending to move the armature to position its poles in an intermediate position relative to the core poles of the respective magnetic circuits.

4. An activator of the character described comprising a core including spaced connected legs forming different magnetic circuits and spaced poles at their free ends in each circuit, alternating current windings for exciting said legs comprising a winding for each magnetic circuit, means connecting said windings in series with each other, connections from the outer ends of the windings respectively to the opposite sides of an A. C. supply, a starting and control switch in one of said latter connections including normally spaced contacts controlling the circuit through the windings and means for temporarily short-circuiting one of the windings, means for operating said switch, an inductively polarized armature adjacent said core poles whereby it is inductively polarized by the electrically magnetized poles and mounted to move across said poles alternately from one magnetic circuit to the other, said armature including spaced poles, and resilient means tending to move the armature poles to an intermediate position relative to the core poles of the respective magnetic circuits against action of the core.

5. An activator comprising a core including different magnetic circuits each comprising spaced magnetic poles, an alternating current winding for exciting each magnetic circuit, means connecting said windings in series with each other and with an alternating current supply, a starting and control switch in the connection from said A. C. supply to one coil including normally spaced contacts controlling the circuit through the windings and means for temporarily short-circuiting one of the windings, means for operating said switch, an inductively polarized armature adjacent said core poles whereby it is inductively polarized by the electrically magnetized poles and mounted to move across said poles alternately from one magnetic circuit to the other, said armature including spaced poles, and resilient means tending to move the armature poles to an intermediate position relative to the core poles of the respective magnetic circuits against action of the core.

6. An activator comprising a core including different magnetic circuits each comprising spaced magnetic poles, an alternating current winding for exciting each magnetic circuit, means connecting said windings in series with each other, a starting and control switch comprising three normally spaced contacts including two outer contacts and an intermediate contact between the outer contacts, means connecting one of the outer contacts with one side of an A. C. supply, means connecting the other side of the A. C. supply to the outer end of one winding, means connecting the intermediate contact to the outer end of the other winding, means connecting the other outer contact with the connection between the windings, means for operating the switch to bring all three contacts temporarily together to close the circuit to the windings and short circuit one winding for starting the activator and then to partially release the contacts to open the short-circuiting circuit while maintaining the winding in circuit with the A. C. supply, an inductively polarized armature adjacent said core poles whereby it is inductively polarized by the electrically magnetized poles and mounted to move across said poles alternatively from one magnetic circuit to the other, said armature including spaced poles, and resilient means tending to move the armature poles to an intermediate position relative to the core poles of the respective magnetic circuits against action of the core.

7. An activator of the character described comprising two magnetic circuits each including spaced magnetic poles of different polarity, electrical coil means for magnetizing the poles by magnetically exciting the two magnetic circuits alternately in a different sense comprising alternating current coil means for exciting said circuits and direct current coils one for each circuit modifying the action of the alternating current means, rectifier means controlling said direct current coils and arranged to excite them alternately on each half cycle of the alternating current, and an inductively polarized armature closely adjacent the poles whereby it is inductively polarized by the electrically magnetized poles, said armature being movable transversely of the poles alternately from one magnetic circuit to the other and comprising a pair of spaced poles with a gap between them and magnetically connected on the opposite side of the gap from the first poles, and resilient means tending to move the armature to position its poles in an intermediate position with respect to the poles of the respective magnetic circuits.

8. A device of the character described comprising a core including spaced members forming different magnetic circuits each including spaced magnetic poles, alternating current windings arranged to energize said magnetic circuits alternately in a different sense, direct current coils one for each magnetic circuit arranged to supplement the alternating current windings, a rectifier connecting said direct current coils with the alternating current windings and arranged to excite said coils alternately in a different sense on each half cycle of the alternating current so their effect on the respective magnetic circuits is added to that of the alternating current windings, an inductively polarized armature movable across said poles alternately from one magnetic circuit to the other and closely adjacent said poles whereby it is inductively polarized by the electrically magnetized poles, said armature comprising spaced poles separated by a transverse recess of sufficient depth to cause a substantial increase in reluctance over the gap between the core poles and the adjacent faces of the armature poles, and resilient means tending to move the armature to an intermediate position.

9. In combination, a reciprocable inductively polarized armature reduced in cross section at its center so that it comprises spaced poles separated by an air gap, magnetic poles on opposite sides thereof in different magnetic circuits, means for positioning said armature between the magnetic poles to permit it to periodically close the magnetic circuit of opposite poles alternately comprising a spring wound in a convolute spiral connected at one end to the armature, a support rigidly mounting the other end of the spring, alternating current windings for magnetizing the second mentioned poles, said armature poles being movable across the latter poles alternately from one magnetic circuit to the other and closely adjacent said poles whereby the armature is inductively polarized by the electrically magnetized poles, and the armature positioning means being tuned to substantially the frequency of the impressed alternating current so that said armature makes a complete to and fro movement but once per cycle of the alternating current.

10. An activator of the character described comprising a core construction including spaced magnetic poles, an armature closely adjacent the poles and movable transversely thereof, supporting means for the armature, means for magnetizing the poles to reciprocate the armature, means for positioning the armature between the magnetic poles to permit it to periodically close the magnetic circuit of opposite poles alternately comprising at least one spring wound in a convolute spiral connected at one end to the armature, and a support rigidly mounting the other end of said spring.

11. An activator of the character described comprising two magnetic circuits each including spaced magnetic poles of different polarity, electrical coil means for magnetizing the poles by magnetically exciting the two magnetic circuits alternately in a different sense comprising two alternating current coils one for each magnetic circuit and connected in series, leads connecting the outer end of each coil respectively to one side of an A. C. supply, an inductively polarized armature closely adjacent the poles whereby it is inductively polarized by the electrically magnetized poles, said armature being movable transversely of the poles alternately from one magnetic circuit to the other and comprising a pair of spaced poles, and resilient means tending to move the armature to position its poles in an intermediate position with respect to the poles of the respective magnetic circuits.

12. An activator comprising two magnetic circuits each including spaced magnetic poles of different polarity, alternating current means for magnetizing the poles comprising a winding for each circuit, means for connecting the windings in series with each other and with a source of A. C. supply, a pair of D. C. windings one for each magnetic circuit arranged in inductive relation to the A. C. winding for that circuit, a rectifier including an intermediate connection between rectifier units, connections from the outer sides of said units to the outer ends respectively of the D. C. windings, an electrical connection between the inner ends of the latter windings, a connection from the intermediate rectifier connection to the connection between the D. C. windings, an inductively polarized armature adjacent said magnetized poles and mounted to move across said poles alternately from one magnetic circuit to the other, said armature including spaced poles, and resilient means tending to move the armature poles to an intermediate position relative to the poles of the respective magnetic circuits.

13. An activator comprising a core including spaced legs forming two magnetic circuits including spaced poles, windings adapted for connection to a current supply for magnetizing the legs, an inductively polarized armature closely adjacent the poles whereby it is inductively polarized by the electrically magnetized poles, means mounting said armature so that it is movable back and forth transversely of the latter poles, said armature comprising a pair of connected poles and of a length slightly less than the distance between the outer poles of the two magnetic circuits, and said armature being provided with narrow extensions at its opposite ends of a length to overlap said outer core poles when the armature is in its intermediate position.

14. A method of locating an armature at the proper spacing from core poles in an activator comprising a core including spaced legs having spaced magnetic poles, an inductively polarized armature closely adjacent the poles whereby it is inductively polarized by the magnetic poles, said armature comprising a pair of connected poles and of a length slightly less than the distance between the outer poles of the core and provided with narrow extensions at its opposite ends in position to overlap the outer core poles when the armature is in its intermediate position, means for supporting the armature adjacent the core poles for back and forth movement across the core poles, said method comprising placing the armature in the supporting means over the ends of the core poles with the armature extensions overlapping the outer core poles, placing a spacer plate between the armature poles and the core poles which plate is of a thickness corresponding to the desired clearance between the armature poles and core poles, magnetizing the core poles with a direct current winding to draw the armature tightly against the spacing plate, making the armature fast in the supporting means while it is so held by attraction of the core poles, and then cutting off the magnetization of the core poles and removing the spacer plate.

15. A method of properly spacing an inductively polarized armature from the poles of a magnetic core in an activator, which method comprises placing the armature closely adjacent the poles of the core, placing between the armature poles and the core poles a spacer plate equal in thickness to the desired clearance between the armature poles and the core poles, magnetizing the core poles with a direct current winding to clamp the armature and spacer plate tightly against the core poles, securing the armature permanently in a supporting means while it is so clamped, cutting off the current to the winding, and then removing the spacer plate.

THOMAS J. MURPHY.

REFERENCES CITED

The following references are of record in the file of this patent:

UNITED STATES PATENTS

| Number | Name | Date |
| --- | --- | --- |
| 2,219,552 | Andis | Oct. 29, 1940 |
| 2,261,813 | Steinbach | Nov. 4, 1941 |
| 2,434,671 | Murphy | Jan. 20, 1948 |